United States Patent [19]

Moore et al.

[11] Patent Number: 4,826,145
[45] Date of Patent: May 2, 1989

[54] RESILIENT TORSION BEARING

[75] Inventors: Alan F. Moore, Burbage; Jerzy Poniatowski, Leicester, both of England

[73] Assignee: Dunlop Limited a British Company, United Kingdom

[21] Appl. No.: 146,186

[22] Filed: Jan. 20, 1988

[30] Foreign Application Priority Data

Jan. 23, 1987 [GB] United Kingdom ............... 8701459
Apr. 14, 1987 [GB] United Kingdom ............... 8708889

[51] Int. Cl.$^4$ .................. B60G 11/22; F16F 7/00; F16F 1/14; F16B 1/00
[52] U.S. Cl. .................. 267/293; 267/140.4; 267/141.2; 267/154; 403/225
[58] Field of Search .............. 267/136, 141.2, 141.1, 267/141.7, 152, 153, 154, 157, 292, 293, 294, 140.4; 52/167; 280/673; 384/125, 297; 403/225, 228, 227

[56] References Cited

U.S. PATENT DOCUMENTS

| | | | |
|---|---|---|---|
| 4,349,184 | 9/1982 | Peterson et al. | 403/228 X |
| 4,401,198 | 8/1983 | Kunczynski | 267/141.2 X |
| 4,609,231 | 9/1987 | Riml | 403/225 X |

FOREIGN PATENT DOCUMENTS

| | | | |
|---|---|---|---|
| 0766558 | 6/1934 | France | 267/141.1 |
| 0063141 | 5/1981 | Japan | 267/141.2 |
| 0055421 | 3/1986 | Japan | 267/154 |

Primary Examiner—Robert J. Oberleitner
Attorney, Agent, or Firm—Stevens, Davis, Miller & Mosher

[57] ABSTRACT

A resilient bearing able to accommodate relative torsional movement between two concentric inner and outer tubular rigid members comprises between those members a resilient bearing having a layer of elastomeric material secured relative to one of the rigid members and a support member for sliding relative to the other rigid member. The support member is axially movable and preferably inclined relative to the axis of the bearing at its interface with the elastomeric material whereby any such axial movement results in compression loading of that elastomeric material.

23 Claims, 3 Drawing Sheets

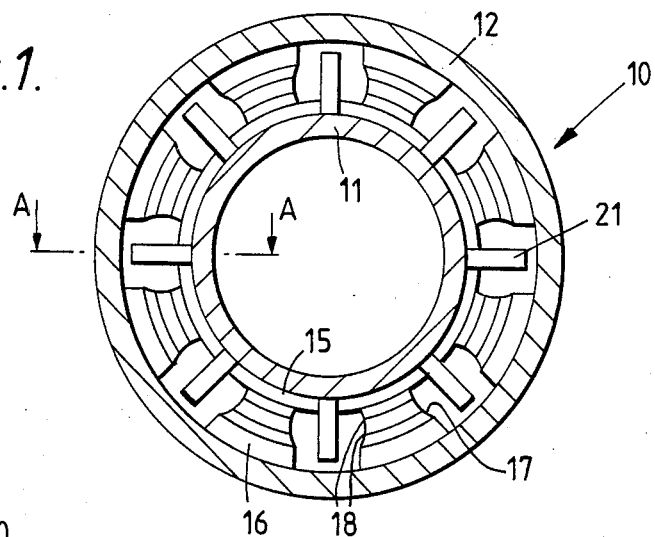
Fig. 1.
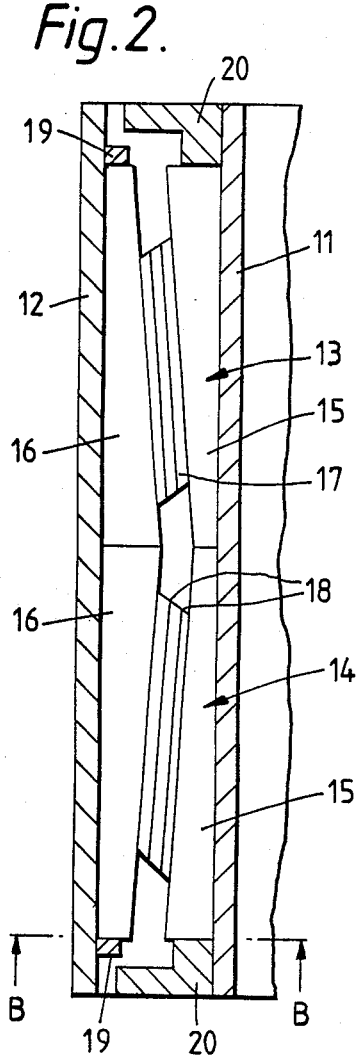
Fig. 2.
Fig. 3.

RESILIENT TORSION BEARING

This invention relates to a resilient bearing and in particular, though not exclusively, to a resilient bearing able to accommodate relative torsional movement of two members by a relative slipping movement of respective component parts of the resilient bearing.

According to one aspect of the present invention a resilient bearing comprises an inner rigid member, an outer rigid member which extends around and is spaced from the inner rigid member to define between the rigid members an annular space and interposed between the rigid members and located in said annular space a resilient elastomeric bearing assembly which resiliently interconnects the inner and outer rigid members and restricts at least initial relative rotational movement of said members, the resilient elastomeric bearing assembly comprising an elastomeric element having a first surface secured relative to one of the inner and outer rigid members for rotational movement therewith and a second surface opposed to said first surface and having a rigid support member secured thereto, said rigid support member being adapted for sliding relative to the other of said inner and outer rigid members during increasing relative rotation of said rigid members, and the support member of the elastomeric bearing assembly being movable or having been moved axially relative to said one of the inner and outer rigid members whereby the elastomeric element becomes or is loaded in compression between the rigid members.

The elastomeric bearing assembly preferably is of an annular form. It may comprise at least one single annular elastomeric bearing element which extends continuously around the inner rigid member or it may comprise a plurality of individual elastomeric bearing elements assembled, and preferably spaced from each other, so as to extend around the inner rigid member to serve as an annular elastomeric bearing.

Preferably the resilient elastomeric bearing assembly comprises a single, i.e. peripherally continuous, elastomeric bearing (as in FIGS. 5 and 6) or a plurality of individual elastomeric bearings each of a type comprising an elastomeric element in the form of a layer of resilient elastomeric material disposed between and adhered to a pair of rigid support members one of which is the aforedescribed said rigid support member adapted for sliding relative to said other of the inner and outer rigid members. One support member of the pair is an inner support member supported by the inner rigid member and the other support member of the pair is an outer support member supported by the outer rigid member. The inner or outer of the support members may be adapted for sliding movement and the other may be adapted for securing to one of the rigid members. Where the elastomeric bearing assembly comprises an elastomeric bearing of this type it is preferred that said support members are movable and retainable or have been moved and retained axially one relative to the other in the longitudinal direction of the resilient bearing whereby the resilient material becomes or is loaded and maintained in compression between said support members.

The present invention is of particular use for resilient bearings of circular cross-sectional shape but it may be applied also to bearings which depart slightly from a circular cross-sectional shape.

Preferably stop means is associated with one of said inner and outer rigid members to restrict the level of torsional load to be accommodated by the elastomeric material. Where an annular elastomeric bearing assembly comprises an annular series of spaced elastomeric bearings it is preferred that stop means be provided between each of the successive pairs of peripherally spaced elastomeric bearings.

Preferably the resilient bearing comprises two axially arranged, and optionally axially spaced annular elastomeric bearing assemblies. More preferably the bearings are each comprised by a similar plurality of individual elastomeric bearings and respective elastomeric bearings of the two pluralities are arranged in axially substantially adjacent pairs.

Preferably said pairs of elastomeric bearings are disposed such that the shear load arising in one bearing due to relative movement of an associated support member to effect said loading of the resilient material in compression substantially equals and opposes the shear load arising in the other bearing of the pair due to relative movement of a support member associated therewith.

Typically the resilient elastomeric material is a material such as natural rubber though other materials such as thermoplastic elastomers may be used.

The or each layer of resilient elastomeric material may be adhered to an associated rigid support member by bonding, by mechanical interlock or, for example, by the use of adhesives either alone or in combination.

One or more substantially rigid insert layers may be provided in the resilient elastomeric material to lie generally parallel with the confronting surfaces of the inner and outer rigid members.

Preferably the resilient elastomeric bearing is formed with inner and outer support members which are laterally offset in said axial, longitudinal direction prior to assembly with the inner and outer rigid members. Subsequent to positioning of the resilient bearings between the rigid members the laterally offset support members are urged to move laterally relative to one another in the axial direction of the resilient bearing such that said relative movement results in pre-loading of the resilient elastomeric material in compression between said support members.

Preferably inner and outer support members of one resilient elastomeric bearing assembly of a pair are moved relative to one another in an axial direction opposite that in which inner and outer support members of the other bearing assembly of the pair are moved relative to one another.

The confronting surfaces of inner and outer rigid support members may be planar, part cylindrical or of other shape selected having regard to the relative movement of the confronting surfaces during said relative movement in the axial direction to result in compression of the resilient material.

Preferably at least one of the confronting surfaces of inner and outer rigid support members is inclined relative to said direction of relative lateral, axial movement whereby said movement results in compression of the interposed resilient elastomeric material. Additionally or alternatively, however, at least one of the respective pairs of confronting surfaces of bearing support members and rigid members is inclined relative to said direction of relative movement whereby said movement results in compression of the interposed resilient material. That is, a radially outer surface of an inner rigid member or an inner surface of an outer rigid member may be inclined relative to said direction of axial, longitudinal movement such that said movement results in compression of the resilient material.

Where pairs of resilient bearings are provided, either inner or, more preferably, outer rigid support members of the two bearings of a pair may be integral with one another.

Preferably the construction of the resilient bearing is such that when support members of an elastomeric bearing have been moved to load the resilient material in compression said material is substantially uniformly loaded in compression and/or is equally loaded at two generally circumferentially extending edges of the material.

Preferably the resilient bearing is of a circular cross-sectional shape thereby to have cylindrically shaped radially outer and inner surfaces of the inner and outer rigid members respectively. Especially in a resilient bearing construction of this kind confronting surfaces of rigid support members preferably are each of a part cylindrical shape.

In general a resilient bush in accordance with the present invention will possess a low level of torsional stiffness especially as compared with the stiffness under radial and axial load.

In order that the resilient bearing can accommodate relative rotation of the inner and outer rigid members greater than that which can be accommodated by the elastomeric bearings it is taught by the present invention that a rigid support member of each elastomeric bearing shall be free to slide relative to one of the inner and outer rigid members when a sufficiently great torsional load is applied to the resilient bearing.

In constructions in which inner and outer rigid support members are provided it is particularly preferred that the resilient bearing be provided with the aforedescribed stop means, said stop means being associated with one of the inner and outer rigid members and the other of said rigid members providing a surface for slipping movement.

To restrict relative axial movement of the inner and outer rigid members one of said rigid members may be provided with an abutment, optionally a peripherally continuous abutment, which extends in a direction towards the other rigid member and is arranged for contact by the rigid support member(s) adjacent said other rigid member or associated stop means when a sufficient level of relative axial movement arises.

Said abutment which limits relative axial movement or other radial restriction abutment means may be provided on the inner or outer rigid member to confront the other rigid member and abut said other rigid member when a prescribed magnitude of relative movement occurs in a generally radial direction.

In a construction in which the resilient bearing comprises a plurality of individual elastomeric bearing elements arranged to serve as an annular elastomeric bearing it is further taught by the present invention that the bearing elements do not necessarily all have the same compression stiffness characteristic. In the case of a resilient bearing intended, in use, normally to be loaded in a specified radial direction it is taught by the present invention that the or each bearing element lying at or close to a diametral plane coincident with said radial direction at one end of the diametral plane shall have a higher compression stiffness in a radial direction than the or each bearing element lying at or close to the other end of the diametral plane. Preferably any circumferentially disposed bearing elements lying intermediate said diametrally disposed elements shall be of intermediate compression stiffness in a radial direction. More preferably the compression stiffness of successive elements shall increase progressively in the direction of each semi-circumferential path from one to the other end of said diametral plane.

Preferably the or each element of the greatest compression stiffness has a stiffness at least twice and more preferably three times that of the or each element of least compression stiffness. It is further preferred that the elements of greatest and least compression stiffness lie at diametrally opposite positions.

The variation of compression stiffness may be achieved by known means such as, for example, choice of elastomeric compound, thickness of elastomeric material or selection of an appropriate number of rigid insert layers in the elastomeric material.

The resilient elastomeric bearing assembly may be constructed such that when the resilient bearing is in an unloaded condition the inner and outer rigid members are concentric. Preferably the elastomeric bearing assembly is constructed such that under the normal working load the inner and outer rigid members lie concentric relative to one another.

Preferably the compression in the resilient elastomeric material of the resilient bearing, when pre-compressed, is such that a maximum relative movement of the rigid members, as limited by any radial-restriction abutment means, in response to an externally applied radial load does not totally relieve the pre-compression in resilient material positioned at a peripheral location at which said movement reduces the magnitude of said pre-compression.

It is further taught by the present invention that prior to movement to compress the interposed resilient material the radial extent of the elastomeric bearing(s) shall be less than that of any radial abutment extending from a rigid member which on assembly may carry the bearing(s). Said abutment may therefore serve to protect the bearing(s) as they and a rigid member are moved axially into position relative to the other rigid member.

To effect pre-compression of the resilient material preferably provision is made for inserting a wedge member or other expansion device, movement of the expansion device causing a contacted rigid support member of a bearing to move and thereby effect compression of the resilient material.

To ensure that the ability of the resilient bearing to resist axial loads is not affected adversely by the ability of a bearing support member to slip in response to relative rotation of the rigid members, guide means may be provided to ensure that the slipping capability is confined to the direction of rotation.

Two embodiments of the present invention will now be described, by way of example, with reference to the accompanying diagrammatic drawings in which:

FIG. 1 is a cross-sectional view on the line B—B of FIG. 2 of a resilient bearing in accordance with the present invention in the absence of externally applied load;

FIG. 2 is a longitudinal section on the line A—A of half of the bearing of FIG. 1;

FIG. 3 shows part of the bearing of FIG. 2 prior to compression, and

Figure 4:
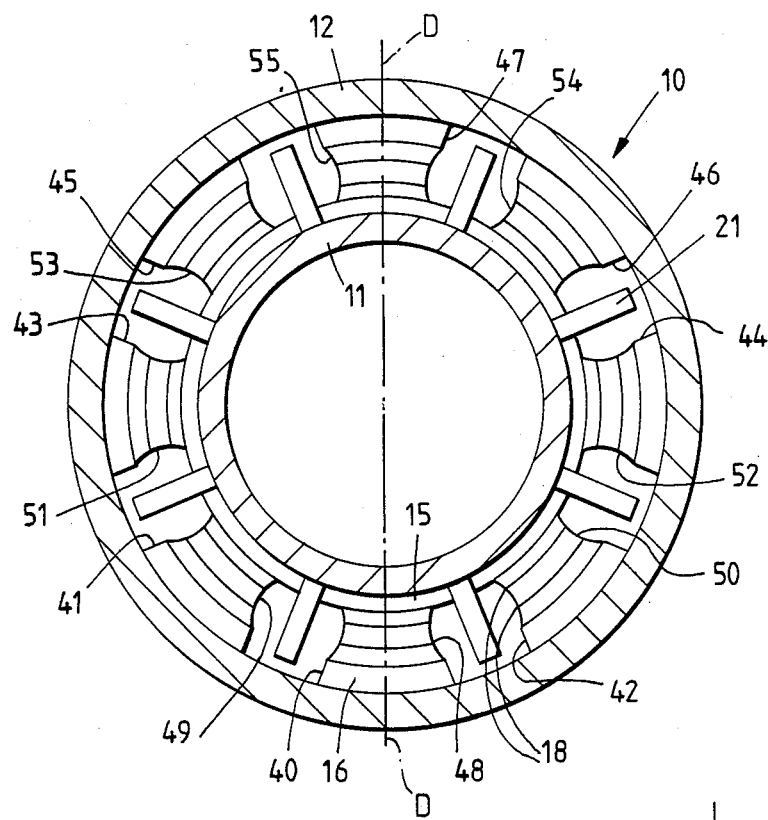
FIG. 4 is a cross-sectional view similar to that of FIG. 1 of another resilient bearing in accordance with the present invention and subject to normal radial working load.
Figure 5:
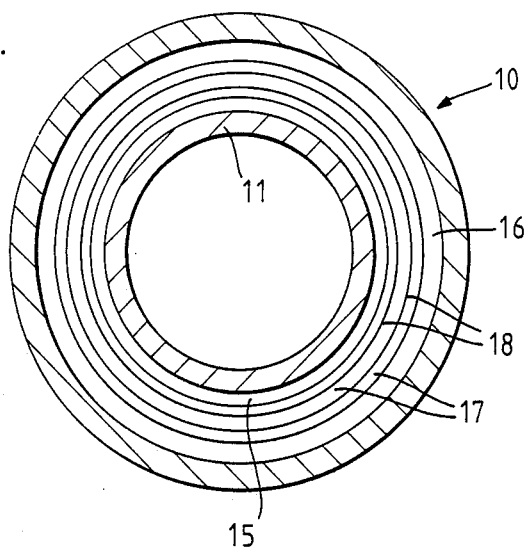
FIG. 5 is a cross-sectional view similar to that of FIG. 1 showing a resilient bearing with a peripherally continuous elastomeric element.
Figure 6:
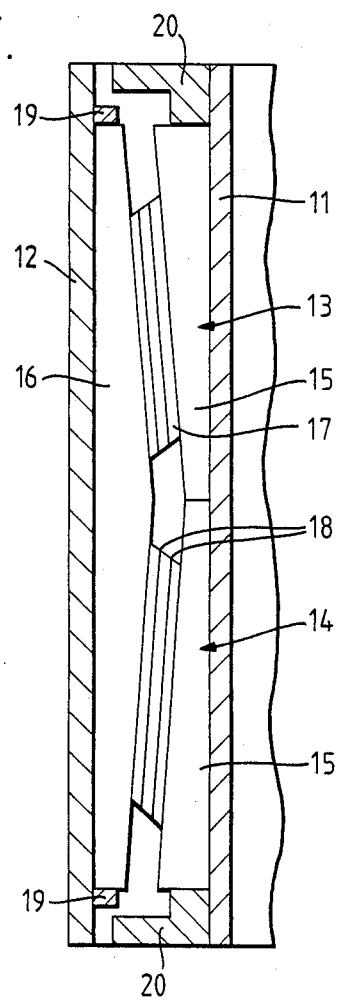
FIG. 6 is a sectional view of FIG. 5 similar to FIG. 2.

A resilient bearing 10 in accordance with the present invention comprises two concentric steel tubes which serve as inner and outer rigid housing members 11,12.

Disposed between the housing members and uniformly spaced in the peripheral, circumferential direction are eight pairs of elastomeric bearings 13,14. The elastomeric bearings of each pair are disposed axially adjacent and the respective bearings of each pair form an annular elastomeric bearing assembly of eight spaced elastomeric bearings.

Each elastomeric bearing 13,14 comprises an inner rigid support member 15, an outer rigid support member 16 and an elastomeric element 17 disposed between said rigid support members and bonded thereto.

The outer surface of the outer support member and inner surface of the inner support member are each of a part cylindrical shape to conform to and bear against the outer and inner housing members respectively.

Confronting bonded surfaces of the support members 15,16 are mutually parallel and inclined to the axis of rotation of the bearing as viewed in FIG. 2, said surfaces thus being of part frusto-conical shape.

Each elastomeric element 17 has embedded therein two steel interleaves 18 which also will be of part frusto-conical shape and bonded to the resilient elastomeric material.

The outer rigid members 16 of each pair are retained against axial movement by a pair of axial limit stops 19 and are free to slide relative to the inner surface of the outer housing member 12.

The inner rigid support members 15 of each pair are restrained against axial movement by a pair of axial limit stops 20 which also engage with the inner rigid support members in a manner which secures the inner support members against rotational movement relative to the inner housing member 11.

Prior to assembly of the elastomeric bearings the elastomeric material thereof is unstrained and the bearing has the inner and outer support members 15,16 thereof laterally offset as shown in FIG. 3. One of the limit stops 20 is selectively removable and locatable whereby an assembly of the pairs of bearings 13,14 between the inner and outer housing members said one of the stops is secured to the inner housing member 11 only after the inner and outer support members are laterally displaced each from the FIG. 3 configuration to an aligned configuration as shown in FIG. 2; location of the removable stop 20 maintains that aligned configuration and the associated radial compression loading in the elastomeric elements 17.

Referring to FIG. 1 it will be seen that a torsion load stop member 21 is provided between each successive pair of inner support members 15. Each stop member is locked relative to the neighbouring support members 15 and extends radially outwards, alongside the outer support members, towards but spaced from the outer housing member 12.

The torsion stop members 21 are dimensioned in the circumferential direction of the resilient bearing 10 such that they allow a prescribed relative rotation of the inner and outer housings in consequence of shear deformation of the elastomeric elements and then each abut an outer support member 16. Additional relative rotation results in a direct transmission of force from the inner housing member to the outer support members and increasing applied torsional loading will cause the outer support members to slip relative to the outer housing member 12.

The present invention does not require that slipping movement shall occur only when the torsion stop members 21 come into operation. The frictional resistance to relative slipping movement may be selected in relation to the shear deformation stress characteristics of the elastomeric elements such that slipping usually occurs prior to operation of the torsion stop members. In this situation the stop members will serve to protect the elastomeric elements from damaging shear strains in the event of an increase in the frictional resistance to slipping above the normal resistance for example due to ingress of foreign particles or existence of an unusually high radial loading.

In the above described construction the pairs of axial limit stops 19 and 20 serve not only to locate the bearings 14,15 axially relative to an associated housing member 11,12 but also respective stops 19 and 20 are engageable to limit relative axial movement of the two housing members 11,12. The stops 20 serve also to limit relative radial movement of the housing members and optionally the torsion stop members 21 may also serve to limit said relative radial movement.

The resilient bearing of the second embodiment illustrated in FIG. 4 is constructed substantially in the same manner as that of the first embodiment except in respect of the elastomeric elements 17. Like reference numerals are used in FIGS. 1 and 4 for like parts.

The line D—D indicates a diametral plane which is parallel with the normal direction in which radial load L is applied to the resilient bearing when in use, and in which condition it is shown in FIG. 4.

Eight pairs of elastomeric bearings 40-47 are disposed between the housing members 11,12 and uniformly spaced in the circumferential direction in the same manner as the above-described bearings 13,14. However, the elastomeric elements 48-55 of the respective bearings are not all of equal compression stiffness as considered in the radial direction of the resilient bearing though the two bearings of each pair are of equal stiffness. The variation of compression stiffness is attained in the case of this embodiment by the use of different elastomeric materials.

One elastomeric bearing 40 lies on the diametral plane D-D at an end thereof at which the bearing 40 will be subject to a greater radial compression load than any of the other elastomeric bearings 41–47. The elastomeric bearing 47 is at the other end and experiences the least radial load. The other bearings 41 to 46 are uniformly disposed between the bearings 40 and 47; the bearings 41,43,45 are symmetrically disposed relative to the bearings 42,44,46 about the diametral plane D—D.

If the elastomeric element 48 of the elastomeric bearing 40 has a radial compression stiffness of 1.00, in this embodiment the elements 49,50 of the bearings 41,42 shall have a stiffness of 0.691, the elements 51,52 of bearings 43,44 shall have a stiffness of 0.4, the elements 53,54 of the bearings 45,46 shall have a stiffness of 0.28 and the element 55 of bearing 47 shall have a stiffness of 0.25.

The variation of stiffness is such that in the absence of externally applied load the inner and outer housing members are offset, but move to a concentric configuration under the action of the normal working load acting in the direction of arrow L.

The compression in the resilient elastomeric material of the resilient bearing, when pre-compressed, is such that a maximum relative movement of the housing members in response to an externally applied load in the direction of arrow L does not totally relieve the pre-compression in the elastomeric element 55 of elastomeric bearing 47, or indeed the pre-compression in any of the other of the elastomeric bearings 40-46.

In a resilient bearing constructed in accordance with the second embodiment of the invention the varying compression stiffness feature results in a higher radial load capacity than that of a resilient bearing in accordance with the first embodiment and constructed to require a corresponding torque to cause slip. Conversely for a corresponding radial load capacity the torque necessary to cause slipping movement is less for the second embodiment construction than the first embodiment construction.

Having now described our invention, what we claim is:

1. A resilient bearing comprising an inner rigid member, an outer rigid member which extends around and is spaced from the inner rigid member to define between the rigid members an annular space and interposed between the rigid members and located in said annular space two axially arranged resilient elastomeric bearing assemblies which resiliently interconnects the inner and outer rigid members and restrict at least initial relative rotational movement of said members, each resilient elastomeric bearing assembly comprising an elastomeric element having a first surface secured relative to one of the inner and outer rigid members for rotational movement therewith by a first rigid support member, a second surface opposed to said first surface and having a second rigid support member secured thereto, said second rigid support member being adapted for sliding relative to the other of said inner and outer rigid members during increasing relative rotation of said rigid members, at least one of said support members of the elastomeric bearing assembly being arranged such that as a result of movement thereof axially relative to said one of the inner and outer rigid members the elastomeric element is loaded in compression between the rigid members, the two resilient elastomeric bearing assemblies being arranged such that movement of said at least one of said rigid support members of one resilient elastomeric bearing assembly of the pair to load the elastomeric element thereof in compression is in an axial direction opposite that in which the corresponding rigid support member of the other bearing assembly of the pair is moved to load the elastomeric element thereof in compression, and the resilient bearing comprising means to retain said support members of the two bearing assemblies in an axial position at which the elastomeric elements are loaded in compression.

2. A resilient bearing according to claim 1 wherein each elastomeric bearing assembly comprises at least one single annular elastomeric bearing element which extends continuously around the inner rigid member.

3. A resilient bearing according to claim 1 wherein each elastomeric bearing assembly comprises a plurality of individual elastomeric bearing elements assembled so as to extend around the inner rigid member to serve as an annular elastomeric bearing.

4. A resilient bearing according to claim 3 wherein the individual elastomeric bearing elements are spaced from each other.

5. A resilient bearing according to claim 1 wherein each elastomeric bearing assembly comprises at least one elastomeric bearing of a type comprising said elastomeric element in the form of layers of resilient elastomeric material and steel interleaves disposed between and adhered to a pair of inner and outer rigid support members one of which is said second rigid support member adapted for sliding relative to said other of said inner and outer rigid members.

6. A resilient bearing according to claim 5 wherein confronting surfaces of said inner and outer rigid support members are of a shape selected having regard to the relative movement of the confronting surfaces during said relative movement in the axial direction to result in compression of the elastomeric material.

7. A resilient bearing according to claim 6 wherein at least one of the confronting surfaces of the inner and outer rigid support members is inclined relative to said direction of relative lateral, axial movement whereby said movement results in compression of the interposed resilient elastomeric material.

8. A resilient bearing according to claim 1 wherein at least one stop means is associated with one of said inner and outer rigid members to restrict the level of torsional load to be accommodated by the elastomeric material.

9. A resilient bearing according to claim 1 wherein the elastomeric bearing assemblies are each comprised by a similar plurality of individual elastomeric bearings and respective elastomeric bearings of the two assemblies are arranged in axially substantially adjacent pairs.

10. A resilient bearing according to claim 9 wherein said pairs of axially substantially adjacent elastomeric bearings are disposed such that the shear load arising in one bearing of a pair due to relative movement of an associated support member to effect said loading of the resilient material in compression substantially equals and opposes the shear load arising in the other bearing of the pair due to relative movement of a support member associated therewith.

11. A resilient bearing according to claim 1 wherein at least one substantially rigid insert layer is provided in at least one resilient elastomeric element and arranged to lie generally parallel with confronting surfaces of the inner and outer rigid members.

12. A resilient bearing according to claim 1 wherein each elastomeric bearing assembly is provided with said support members arranged as inner and outer support members which are laterally offset in the axial, longitudinal direction prior to assembly with the inner and outer rigid members.

13. A resilient bearing according to claim 1 wherein each elastomeric bearing assembly comprises a plurality of elastomeric bearing elements which do not have a common compression stiffness characteristic.

14. A resilient bearing according to claim 13 wherein a bearing element lying in the region of a diametral plane at one end thereof has a higher compression stiffness than other bearing elements of the resilient element and that the bearing element lying in the region of the other end of said diametral plane has a lower compression stiffness than the other bearing elements of the resilient bearing.

15. A resilient bearing according to claim 14 wherein the compression stiffness of successive bearing elements increases progressively in the direction of each substantially semicircumferential path from said other end of said diametral plane to said one end.

16. A resilient bearing comprising an inner rigid member, an outer rigid member which extends around and is spaced from the inner rigid member to define between the rigid members an annular space and interposed between the rigid members and located in said annular space two axially arranged resilient elastomeric bearing assemblies which resiliently interconnect the inner and outer rigid members and restrict at least initial relative rotational movement of said members, each resilient elastomeric bearing assembly comprising an elastomeric element provided with a pair of inner and outer rigid support members, one of said rigid support members being secured relative to one of the inner and outer rigid members for rotational movement therewith, another of said rigid support members being adapted for sliding relative to the other of said inner and outer rigid members during increasing relative rotation of said rigid members, the support members of each elastomeric bearing assembly being arranged such that as a result of movement thereof axially relative to one another the elastomeric element is loaded in compression between the rigid members, the two resilient elastomeric bearing assemblies being arranged such that movement of a rigid support member of one resilient elastomeric bearing assembly of a pair to load the elastomeric element thereof in compression is in an axial direction opposite that in which a rigid support member of the other bearing assembly of the pair is moved to load the elastomeric element thereof in compression, and the resilient bearing comprising means to retain said support members of the two bearing assemblies in an axial position at which the elastomeric elements are loaded in compression.

17. A resilient bearing comprising an inner rigid member, an outer rigid member which extends around and is spaced from the inner rigid member to define between the rigid members an annular space and interposed between the rigid members and located in said annular space a resilient elastomeric bearing assembly which resiliently interconnects the inner and outer rigid members and restricts at least initial relative rotational movement of said members, the resilient elastomeric bearing assembly comprising an elastomeric element having a first surface secured relative to one of the inner and outer rigid members for rotational movement therewith by a first rigid support member, a second surface opposed to said first surface and having a second rigid support member secured thereto, said second rigid support member being adapted for sliding relative to the other of said inner and outer rigid members during increasing relative rotation of said rigid members, at least one of said support members of the elastomeric bearing assembly being arranged such that as a result of movement thereof axially relative to said one of the inner and outer rigid members the elastomeric element is loaded in compression between the rigid members, the elastomeric bearing assembly comprising a plurality of elastomeric bearing elements which do not have a common compression stiffness characteristic, a bearing element lying in the region of a diametral plane at one end thereof having a higher compression stiffness than other bearing elements of the resilient element and the bearing element lying in the region of the other end of said diametral plane having a lower compression stiffness than the other bearing elements of the resilient bearing, and the resilient bearing comprising means to retain said support members in an axial position at which the elastomeric elements are loaded in compression.

18. A resilient bearing according to claim 17 and comprising two axially arranged elastomeric bearing assemblies.

19. A resilient bearing according to claim 18 wherein one of the inner and outer rigid support members of one of the two bearings of a pair is integral with a respective one of the inner and outer rigid support members of the other bearing of the pair.

20. A resilient bearing according to claim 17 wherein the elastomeric bearing assembly is provided with inner and outer support members which are laterally offset in the axial, longitudinal direction prior to assembly with the inner and outer rigid members, the laterally offset support members being arranged such that, subsequent to positioning of the elastomeric bearing assembly between said rigid members, movement of the laterally offset support members laterally relative to one another in the axial direction of the resilient bearing results in pre-loading of the resilient elastomeric material in compression between said support members.

21. A resilient bearing according to claim 20 and comprising two axially arranged elastomeric bearing assemblies, said assemblies being arranged such that movement of laterally offset inner and outer support members of one resilient elastomeric bearing assembly of a pair to load the elastomeric element thereof in compression is in an axial direction opposite that in which the inner and outer support members of the other bearing assembly of the pair are moved relative to one another to effect compression of the elastomeric element of said other bearing assembly.

22. A resilient bearing according to claim 17 wherein the compression stiffness of successive bearing elements increases progressively in the direction of each substantially semicircumferential path from said other end of said diametral plane to said one end.

23. A resilient bearing comprising an inner rigid member, an outer rigid member which extends around and is spaced from the inner rigid member to define between the rigid members an annular space and interposed between the rigid members and located in said annular space a resilient elastomeric bearing assembly which resiliently interconnects the inner and outer rigid members and restricts at least initial relative rotational movement of said members, the resilient elastomeric bearing assembly comprising an elastomeric element having a first surface secured relative to one of the inner and outer rigid members for rotational movement therewith by a first rigid support member, a second surface opposed to said first surface and having a second rigid support member secured thereto, said second rigid support member being adapted for sliding relative to the other of said inner and outer rigid members during increasing relative rotation of said rigid members, at least one of said support members of the elastomeric bearing assembly being arranged such that as a result of movement thereof axially relative to said one of the inner and outer rigid members the elastomeric element is loaded in compression between the rigid members, at least one stop means associated with one of said inner and outer rigid members to restrict the level of torsional load to be accommodated by the elastomeric material, and the resilient bearing comprising means to retain said support members in an axial position at which the elastomeric element is loaded in compression.

* * * * *